(12) United States Patent
Branson et al.

(10) Patent No.: US 9,363,153 B2
(45) Date of Patent: *Jun. 7, 2016

(54) MONITORING SIMILAR DATA IN STREAM COMPUTING

(71) Applicant: International Business Machines Corporation, Armonk, NY (US)

(72) Inventors: Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 310 days.

This patent is subject to a terminal disclaimer.

(21) Appl. No.: 14/058,883

(22) Filed: Oct. 21, 2013

(65) Prior Publication Data

US 2014/0365614 A1 Dec. 11, 2014

Related U.S. Application Data

(63) Continuation of application No. 13/914,148, filed on Jun. 10, 2013.

(51) Int. Cl.
*G06F 15/16* (2006.01)
*H04L 12/26* (2006.01)
*H04L 12/24* (2006.01)

(52) U.S. Cl.
CPC ............ *H04L 43/028* (2013.01); *H04L 43/026* (2013.01); *H04L 41/5096* (2013.01)

(58) Field of Classification Search
CPC . H04L 41/5096; H04L 43/026; H04L 43/028; H04L 67/10; H04L 29/08072; H04L 29/06
See application file for complete search history.

(56) References Cited

U.S. PATENT DOCUMENTS

| | | | |
|---|---|---|---|
| 7,613,848 B2 | 11/2009 | Amini et al. |
| 7,644,110 B2 | 1/2010 | Nishizawa et al. |
| 7,814,284 B1 | 10/2010 | Glass et al. |
| 8,069,283 B2 | 11/2011 | Cumpson et al. |
| 8,095,690 B2 | 1/2012 | Kashiyama et al. |
| 8,145,778 B2 | 3/2012 | Pickens et al. |
| 8,560,527 B2 | 10/2013 | Santosuosso et al. |
| 8,831,995 B2 | 9/2014 | Holler et al. |

(Continued)

OTHER PUBLICATIONS

IBM Redbook "IBM InfoSphere Streams: Harnessing Data in Motion" (Sep. 2010 ) to Ballard et al. ("Ballard").*
Moga, et al., upstream, "Storage-centric Load Management for Data Streams with Update Semantics," Technical Report #620, ETH Zurich, D-INFK, Mar. 2009.

(Continued)

*Primary Examiner* — June Sison
(74) *Attorney, Agent, or Firm* — Nolan M. Lawrence; Feb R Cabrasawan

(57) ABSTRACT

A method, system, and computer program product for monitoring similar data in stream computing are disclosed. The method may include, monitoring at least one input stream of tuples to be processed by an application. The application may comprise one or more processing elements operating on one or more computer processors and each tuple is an instance of data. The method may also include, identifying a first tuple in the input stream and the first tuple is a first instance of first data. Also, the method may include, identifying a second tuple in the input stream and the second tuple is a second instance of first data. Furthermore, the method may include, determining that the second tuple satisfies criteria for superseding the first tuple and eliminating the first tuple from the application.

10 Claims, 9 Drawing Sheets

(56) References Cited

U.S. PATENT DOCUMENTS

| | | | |
|---|---|---|---|
| 8,892,691 B2 | 11/2014 | Pantos et al. | |
| 2008/0168179 A1* | 7/2008 | Gu | G06F 17/30985 709/231 |
| 2011/0016135 A1 | 1/2011 | Teerlink | |
| 2012/0005309 A1 | 1/2012 | Obata et al. | |
| 2012/0218268 A1 | 8/2012 | Accola et al. | |
| 2014/0365612 A1 | 12/2014 | Branson et al. | |
| 2014/0365614 A1* | 12/2014 | Branson | H04L 43/026 709/219 |
| 2014/0372431 A1* | 12/2014 | Branson | G06F 17/30943 707/736 |
| 2014/0373019 A1* | 12/2014 | Branson | G06F 17/30943 718/102 |

OTHER PUBLICATIONS

Kalyvianaki, et al., "Data Stream Processing in the Cloud," Large-Scale Distributed Systems Group, http://lsds.doc.ic.ac.uk, Imperial College London, Department of Computing, Doctoral School Day in Cloud Computing, Université catholique de Louvain, Nov. 2012.

Branson, et al., "Ending Tuple Processing in a Stream-Based Computing Application,", U.S. Appl. No. 13/840,322, filed Mar. 15, 2013.

Ballard, et al., "IBM InfoSphere Streams: Harnessing Data in Motion," Sep. 2010, 360 pages, IBM Redbooks, htttp://www.redbooks.ibm/abstracts/sg247865.html.

Santosuosso et al., "Management System for Processing Streaming Data," Filed Jul. 26, 2011, U.S. Appl. No. 13/190,810.

Branson et al., "Monitoring Similar Data in Stream Computing," U.S. Appl. No. 13/914,148, filed Jun. 10, 2013.

Abadi et al., "Aurora: a new model and architecture for data stream management", VLDB Journal (2003), 20 pages.

* cited by examiner

MONITORING SIMILAR DATA IN STREAM COMPUTING

CROSS-REFERENCE TO RELATED APPLICATIONS

This application is a continuation of co-pending U.S. patent application Ser. No. 13/914,148, filed Jun. 10, 2013. The aforementioned related patent application is herein incorporated by reference in its entirety.

FIELD

This disclosure generally relates to stream computing, and in particular, to computing applications that receive streaming data and process the data as it is received.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program product receive two or more tuples to be processed by a plurality of processing elements operating on one or more computer processors.

In one embodiment, a method for monitoring similar data in stream computing is described. The method may include monitoring at least one input steam of tuples to be processed by an application. The application may comprise one or more processing elements operating on one or more computer processors and each tuple is an instance of data. The method may also identify a first tuple in an input stream and the first tuple may be a first instance of first data. Also, the method may identity a second tuple in an input stream and the second tuple may be a second instance of first data. Furthermore, the method may determine that the second tuple satisfies criteria for superseding the first tuple and the method may eliminate the first tuple from the application.

In another embodiment, a system for monitoring similar data in stream computing is described. The system may include an application configured to process an input stream of tuples, each tuple is an instance of data, and the application may comprise one or more processing elements operating on one or more computer processors. The system may also include a stream manager configured to identify a first tuple in the input stream and the first tuple may be a first instance of first data. The stream manager may also be configured to identify a second tuple in the input stream and the second tuple may be a second instance of first data. Furthermore, the stream manager may be configured to determine that the second tuple satisfies criteria for superseding the first tuple and the stream manager may eliminate the first tuple from the application.

Yet another embodiment is directed to a computer program product.

BRIEF DESCRIPTION OF THE DRAWINGS

Like reference numbers and designations in the various drawings indicate like elements.

DETAILED DESCRIPTION

Figure 1:
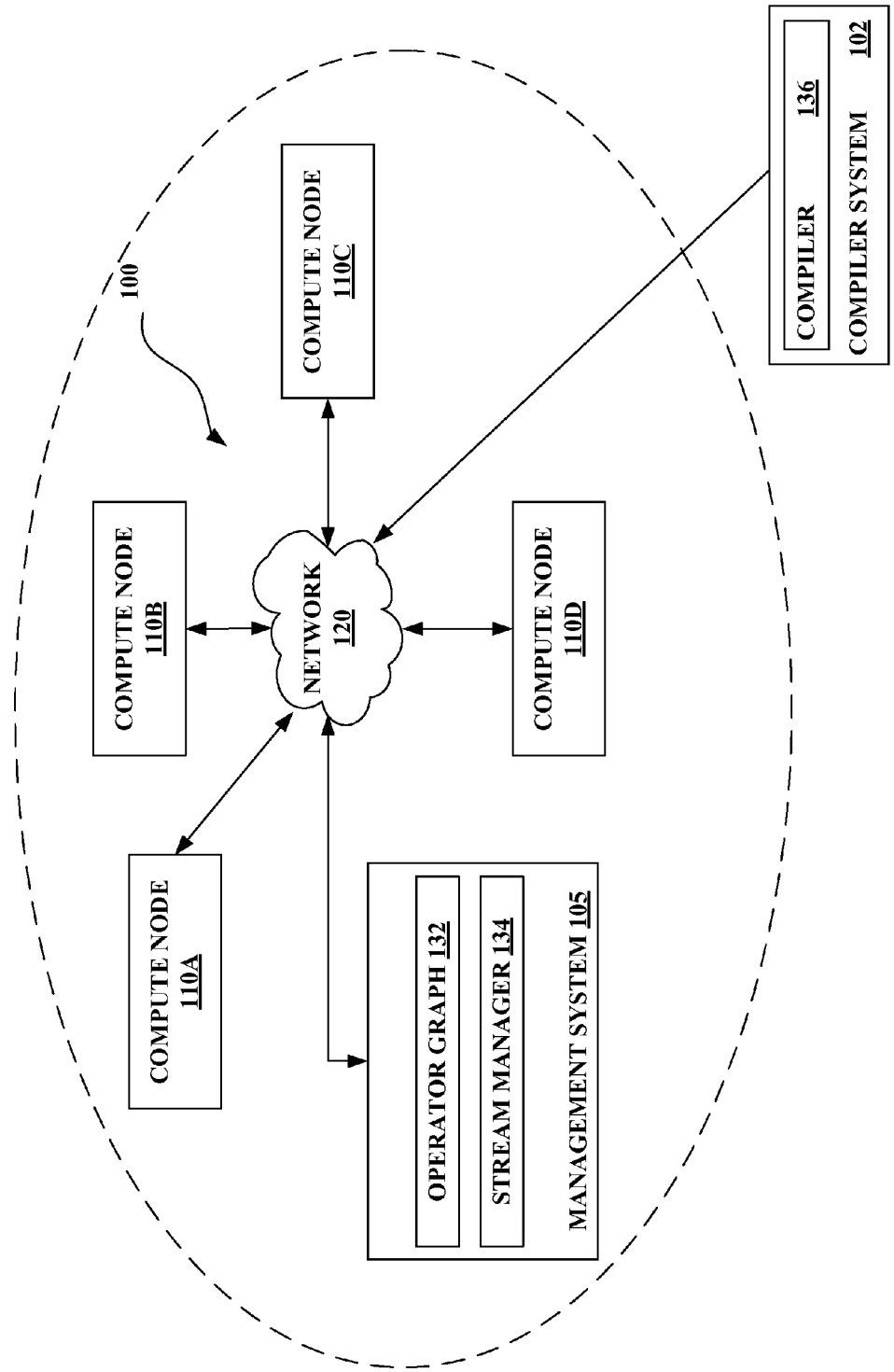
FIG. 1 illustrates a computing infrastructure configured to execute a stream computing application according to various embodiments.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, via an analysis logic, which may change the tuple by adding or subtracting attributes, or updating the values of existing attributes within the tuple. When the analysis logic is complete, a new tuple is then sent to the next stream operator. An application is distributed across nodes by creating executables, which may be referred to as "processing elements." Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. An attribute may be a file, e.g., image or audio data. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. When a stream operator receives a tuple, it may perform operations, such as analysis logic, which can change the tuple by adding or subtracting attributes, or updating the values of existing attributes within the tuple. When the analysis logic is done, a new tuple is then sent to the next stream operator. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. Because an output tuple may be considered a different tuple from a corresponding input tuple, a parent-child scheme may be useful for tracking tuple flow in an operator graph. In an exemplary scheme, any tuple may be designated a parent tuple. For example, a tuple entering an operator graph or a tuple output by a source operator may be designated as a parent tuple. Generally, when a parent tuple is received by a stream operator or processing element, the output corresponding with the input tuple may be designated a child of the parent. The child tuple may in turn be input to another stream operator or processing element. The output from the second stream operator or processing element corresponding with the input child tuple may also be designated a child of the parent, as further described below. In addition, as mentioned, any tuple may be designated a parent tuple. Accordingly, a tuple that is a child of a parent tuple may itself be designated a parent tuple.

While a parent-child scheme may be useful for tracking tuple flow in an operator graph in some contexts, in other contexts it may be simpler to refer to both an input tuple and a corresponding output tuple as the same tuple.

In stream computing applications, the stream operators and processing elements of an operator graph may be distributed across multiple compute nodes as well as within individual compute nodes. Processing elements and stream operators in distinct processing elements may be connected by inter-process communication paths. An "inter-process communication path," as used herein, may refer to operations that use a network and employ an internet socket, such as a TCP/IP socket, a stream socket, a datagram socket, or any other similar operation. An inter-process communication path, as used herein, may also refer to operations that employ a shared memory segment, a pipe, a named pipe (also known as a FIFO), a message queue, a memory mapped file, a UNIX domain or inter-process communication socket, or any other similar operation.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

In many distributed processing applications, data is ingested and then processed in any number of steps, until the processing is complete and the goal of the application is met. Processing of the data can be time consuming, and when the processing rates are high or resources are limited, processing of a particular instance of data can be delayed as it waits for other data to complete a processing step. The result of this is that a given instance of data could remain in the application for a somewhat unpredictable period of time, depending on how long the wait is at various parts of the application.

This situation is especially significant in the processing of data-in-motion, where data streams are processed as they are produced in real-time or near real-time. A delay in processing a particular instance of data, where the instance of data is a tuple, increases the age of the tuple, possibly reducing its value in a real-time scenario. In some application scenarios, a tuple that is delayed too long may lose all of its value and become irrelevant.

Eliminating a tuple that is being processed or is going to be processed by an application when "better" data enters the application that supersedes it, may provide multiple benefits. For instance, removing irrelevant tuples from the application may decrease the amount of tuples that contribute to irrelevant results. Also, reduction of the overall amount of tuples that the application must process may improve the processing speed for the application as a whole.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120. The compiler system 102 may also store a compiler 136.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
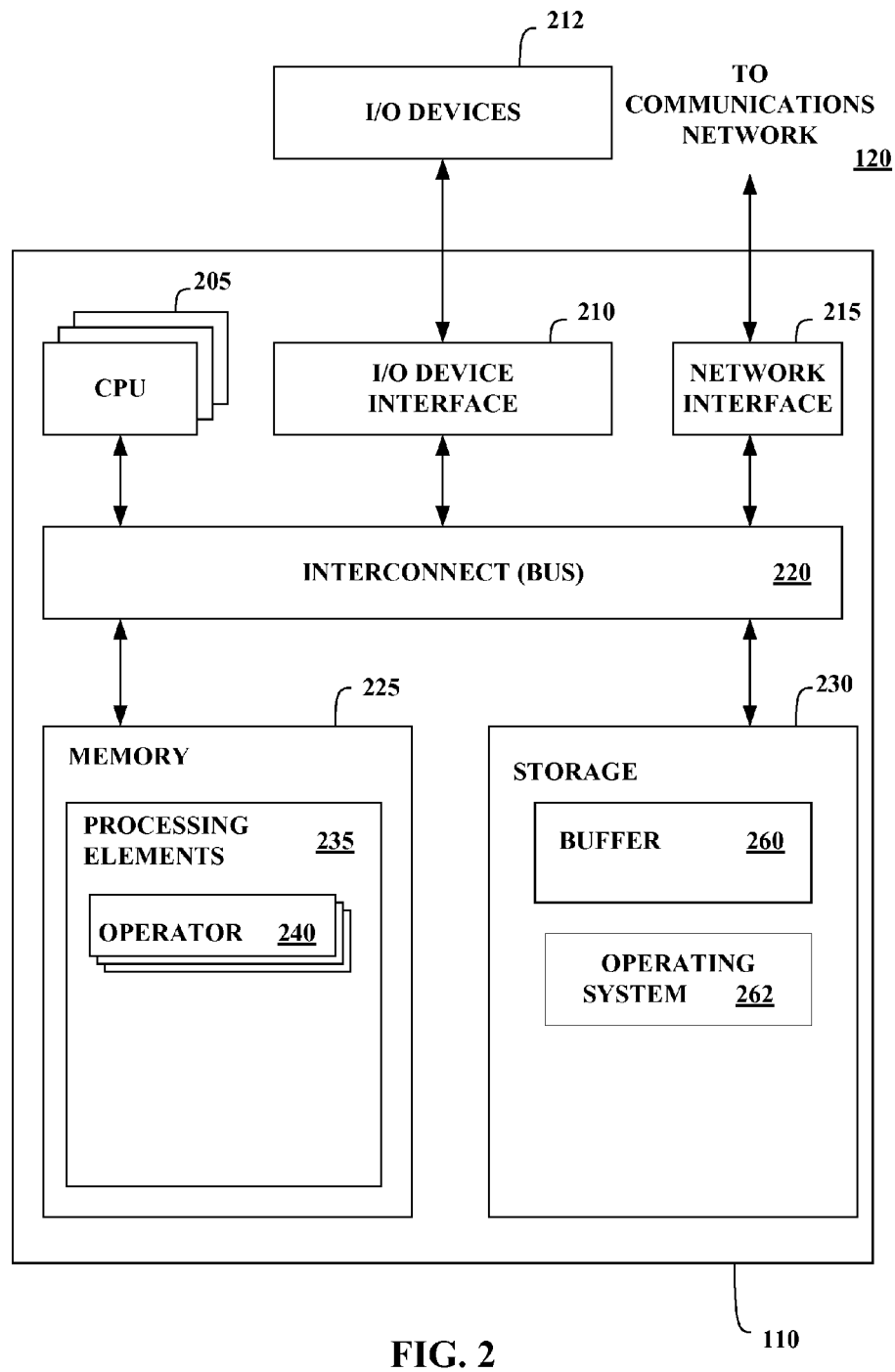
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage 230, the buffer 260 may alternatively be located in the memory 225 of the compute node 110 or in a combination of both memory 225 and storage 230. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
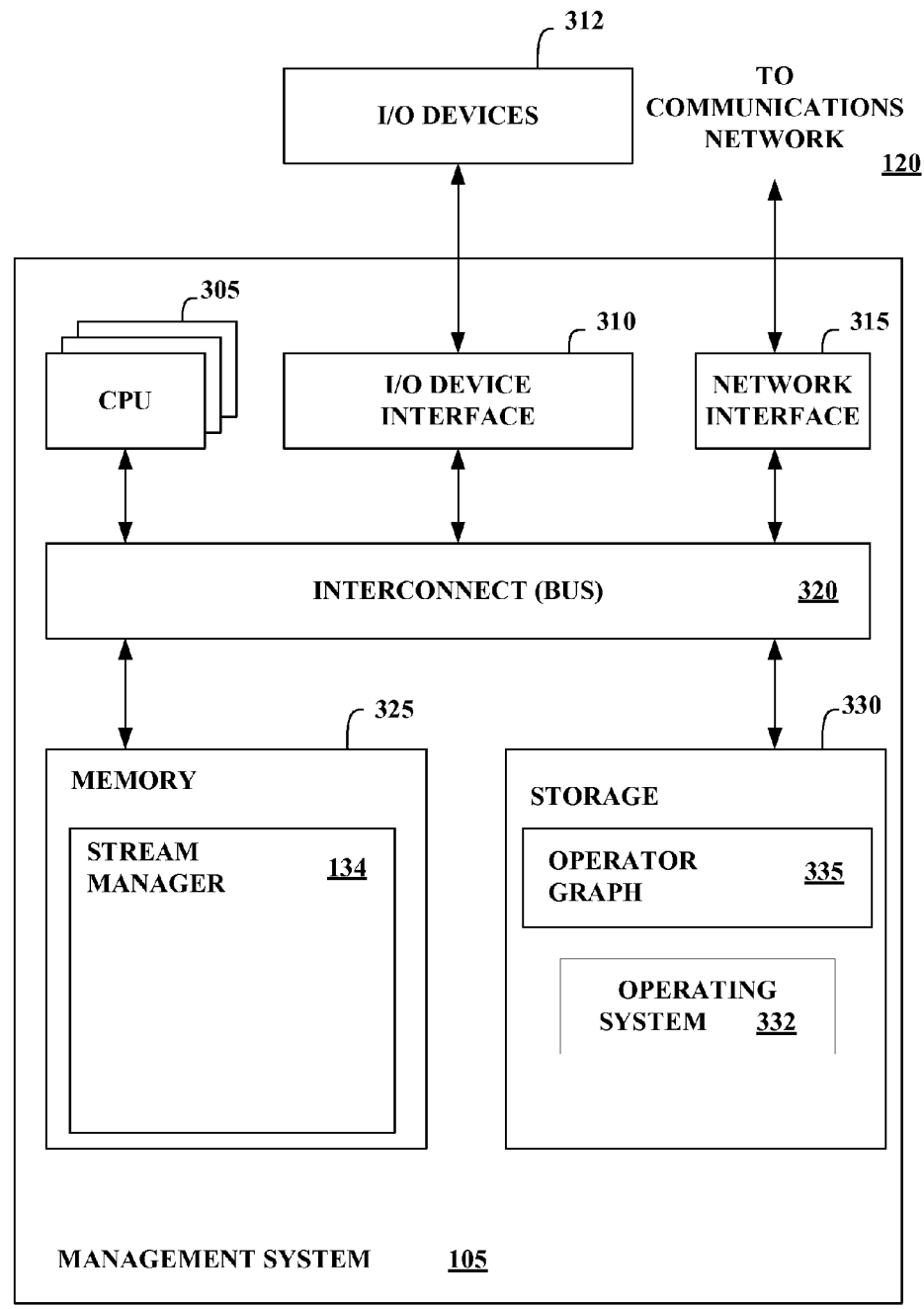
FIG. 3 illustrates a more detailed view of the management system of FIG. 1 according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing.

The management system 105 may include one or more operating systems 332. An operating system 332 may be stored partially in memory 325 and partially in storage 330.

Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
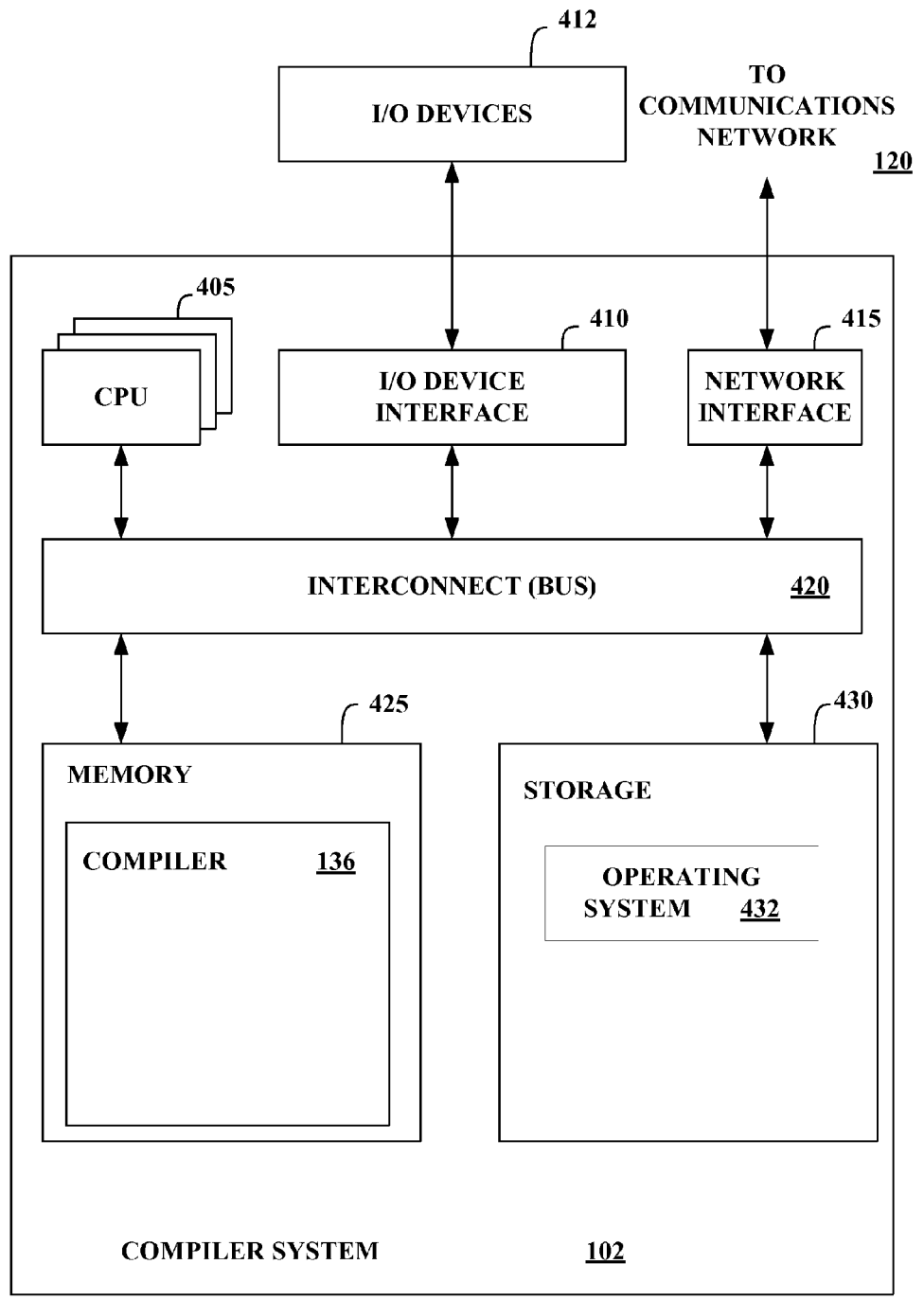
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system 432 may be stored entirely in memory 425 or entirely in storage 430. The operating system 432 provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
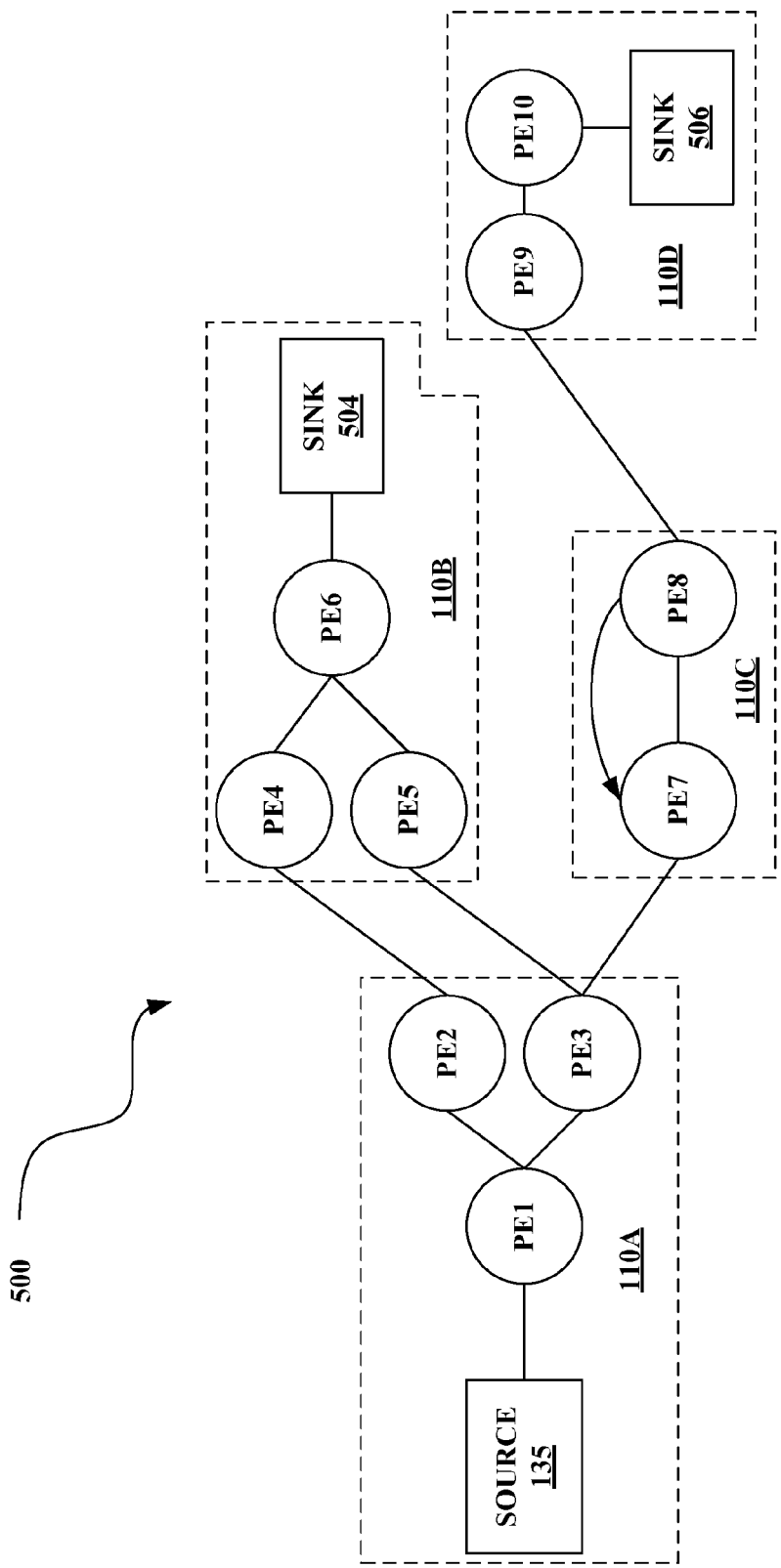
FIG. 5 illustrates an operator graph for a stream computing application according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6

504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
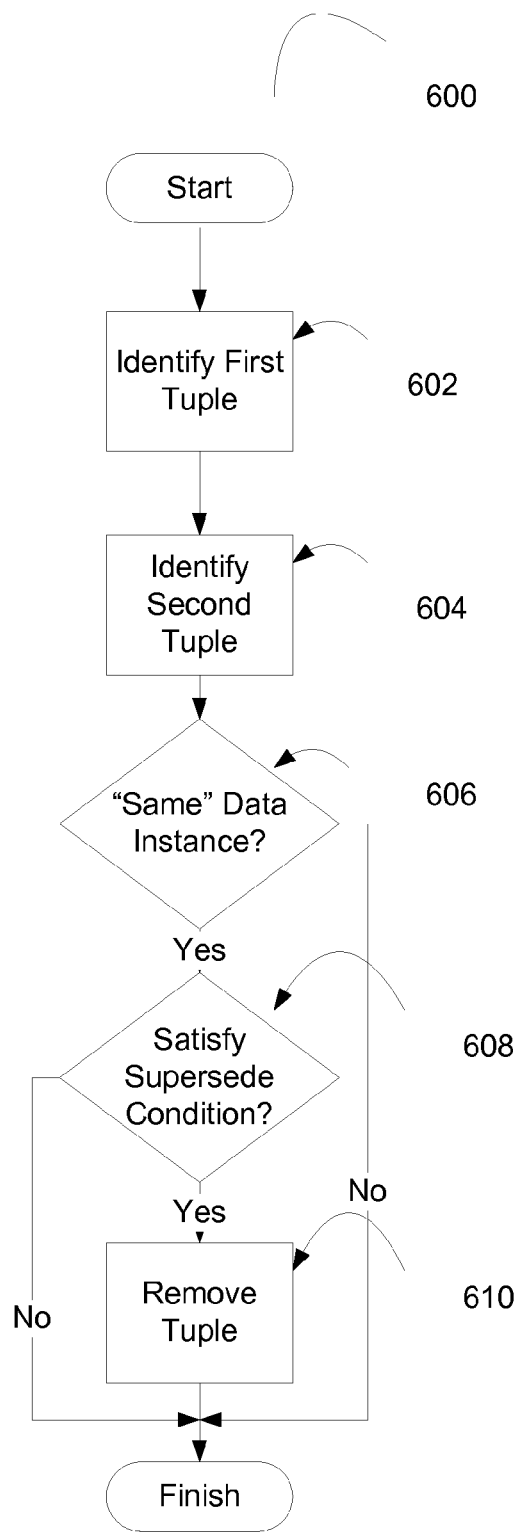
FIG. 6 illustrates a high-level method for eliminating a first tuple from an application when a second tuple in the application is a "same" instance of data and the second tuple satisfies the supersede condition.

FIG. 6 illustrates a high-level method 600 for eliminating a first tuple from an application when a second tuple in the application is a "same" instance of data and the second tuple satisfies the supersede condition. A developer may define whether the Stream Manager 134 is to perform method 600 on a portion of the application, multiple portions of the application, or the application as a whole. If the Stream Manager 134 is performing method 600 on a portion of the application, a tuple that has left the portion of the application can no longer be eliminated from the application by the Stream Manager 134 when another tuple that is an instance of the "same" data and has "better" data enters the portion of the application. If the Stream Manager 134 is performing method 600 on multiple portions of the application, a tuple that has left one portion of the application can no longer be eliminated from the application by the Stream Manager 134 when another tuple that is an instance of the "same" data and has "better" data enters the same portion of the application. However, the tuple can be eliminated from the application if it enters a second portion of the application and the Stream Manager 134 is performing method 600 on the second portion of the application and there is another tuple that is an instance of the "same" data and has "better" data and enters or is in the second portion of the application. If the Stream Manager 134 is performing method 600 on the application as a whole, a tuple that has not exited the application can be removed from the application whenever another tuple that is an instance of the "same" data and has "better" data enters the application.

In operation 602, a first tuple may be received from the input stream and may be identified by the Stream Manager 134. In operation 604, a second tuple may be received from the input stream and may be identified by the Stream Manager 134. In operation 606, the Stream Manager may determine if the first tuple and the second tuple are two instances of the "same" data i.e. whether the second tuple is information about the "same" subject as the first tuple. If the first tuple and the second tuple are instances of the same data, the Stream Manager 134 may determine whether the second tuple satisfies the supersede condition 608. If the first tuple and the second tuple are not instances of the "same" data, both tuples will be retained in the application and the method is complete. However, a third tuple may be received from the input stream at a later time and the Stream Manager 134 may determine if the third tuple is an instance of the "same" data as the first or second tuple 606.

In operation 608, the Stream Manager 134 may determine whether the second tuple satisfies the supersede condition. If the second tuple does satisfy the supersede condition, the Stream Manager 134 may remove the first tuple from the application at operation 610.

Figure 7:
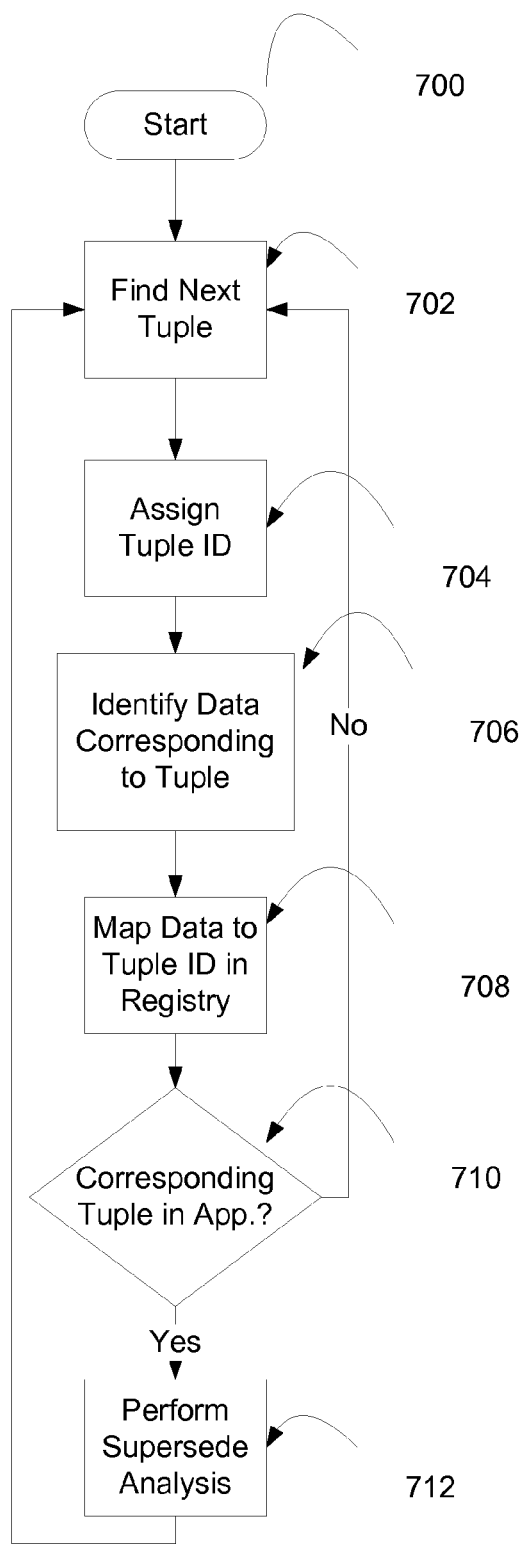
FIG. 7 illustrates a more detailed method for determining whether two tuples are instances of the "same" data.

FIG. 7 illustrates a more detailed method 700 for determining whether two tuples are instances of the "same" data. To determine whether two tuples are instances of the "same" data, a developer may define criteria that will determine if two tuples are instances of the "same" data. For example, the developer may decide that the price of a stock is an instance of data and the price of the same stock at two different times, are two instances of the same data. Therefore, the price of the stock at the first time may be given by the first tuple and the price of the stock at the second time may be given by the second tuple. Another example may be a photograph of an image as an instance of data. One tuple may be a photograph of the image from one camera and a second tuple may be a photograph of the image from a second camera. A further example may be a temperature reading of an area as an instance of data. One tuple may be a temperature reading of an area from a sensor in one location and a second tuple may be a temperature reading of the same area from a second sensor in a second location.

Figure 9:
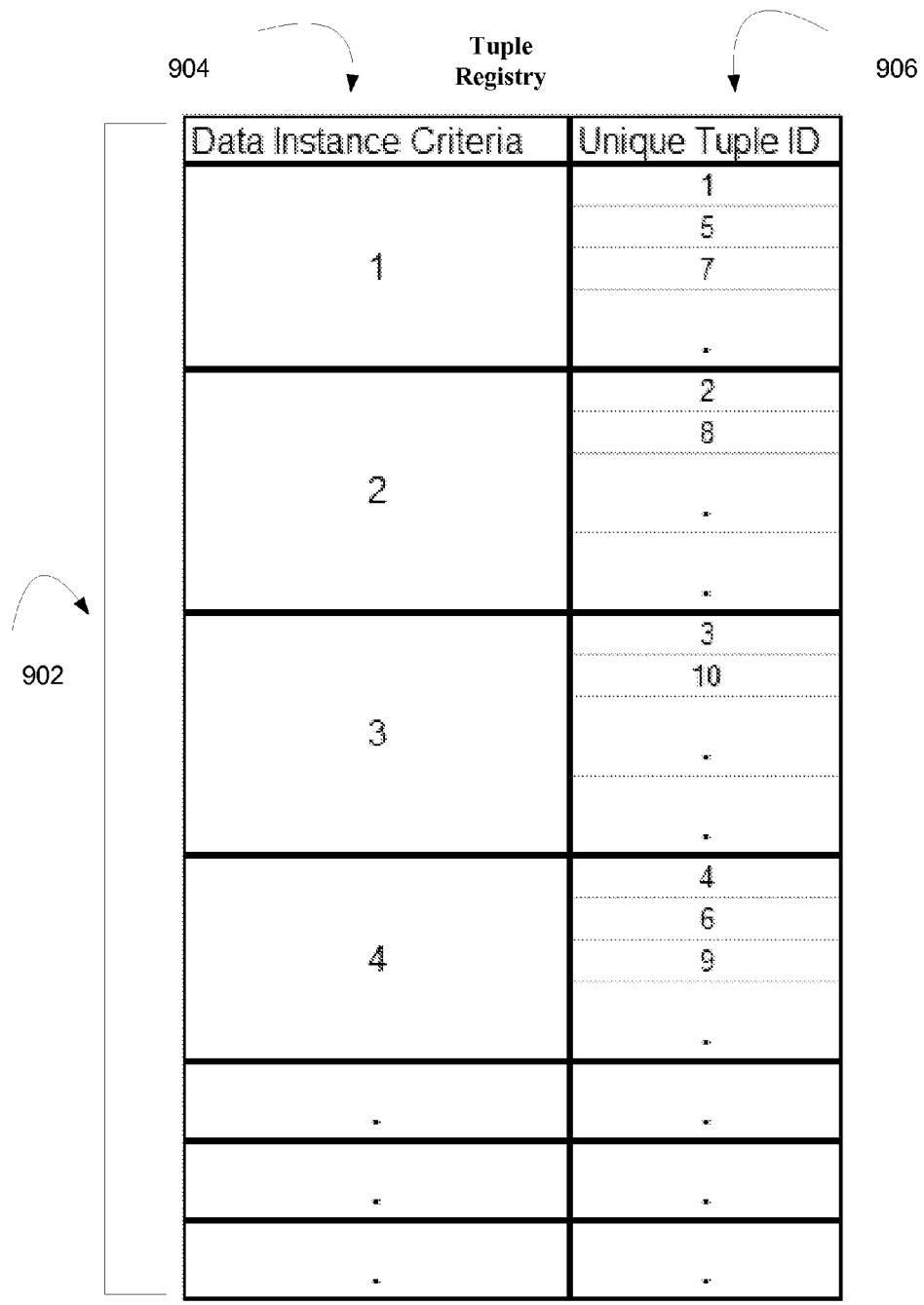
FIG. 9 illustrates a Tuple Registry configured to store Unique Tuple Identifiers under Data Instance Criteria.

In operation 702, the Stream Manager 134 may get the next tuple coming into the application in the input stream. In operation 704, the Stream Manager 134 may assign that tuple a unique tuple identifier. In operation 706, the Stream Manager 134 may identify the data of which the tuple is an instance. In operation 708, the Stream Manager 134 may map the data to the tuple and place the unique tuple identifier in a Tuple Registry 902, subsequently shown in FIG. 9. In some embodiments, the Tuple Registry 902 may be categorized into Data Instance Criteria 904, subsequently shown in FIG. 9, and the Unique Tuple Identifiers 906, subsequently shown in FIG. 9, may be placed in the group of which the tuple is an instance of that data. Within the Tuple Registry 902 and a Data Instance Criteria 904, there may be several Unique Tuple Identifiers 904 and the list may expand or retract based upon tuples exiting the application. Tuples may exit the application, for example, because of method 600, because a tuple has been processed by the application, or for some other reason. The Tuple Registry 902 may not only provide a categorization of which tuples are an instance of the "same" data, but also a collective list of which tuples will be processed or are being processed by the application.

In operation 710, the Stream Manager 134 may determine whether the tuple is an instance of the "same" data as another tuple that has not exited the application. In one embodiment, the Stream Manager 134 may determine if two tuples are instances for the "same" data by observing whether another tuple exists in the same group as the current tuple. If another tuple does exist in the same group, the Stream Manager may perform the supersede analysis 712. If no tuple exists in the same group, the Stream Manager will get the next tuple coming into the application in the input stream 702.

Figure 8:
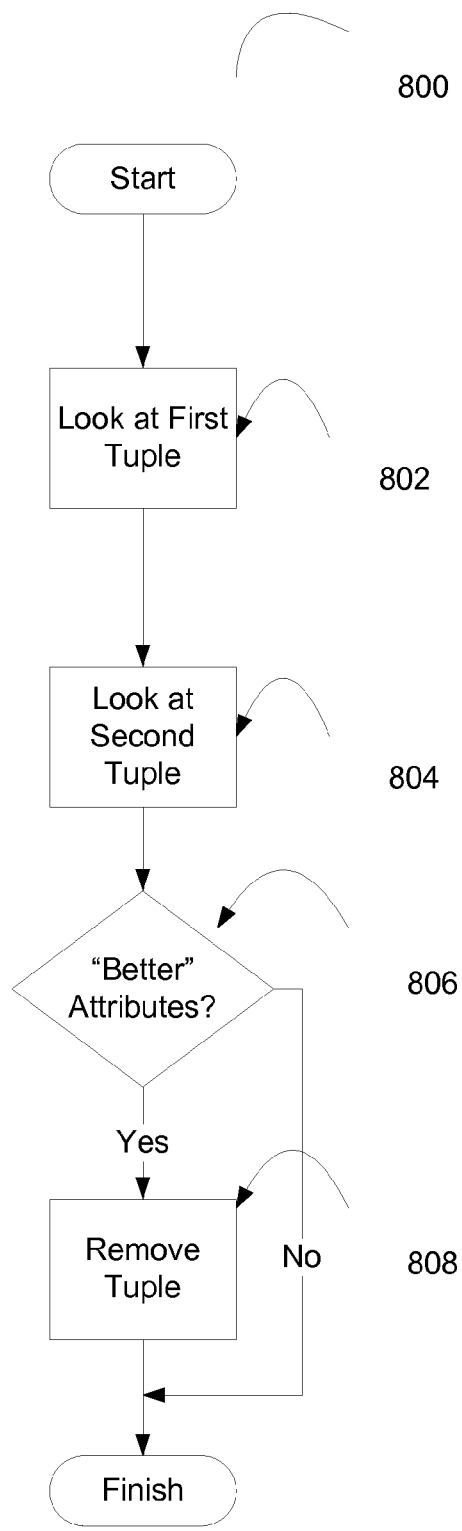
FIG. 8 illustrates a more detailed method for determining whether the second tuple satisfies the supersede condition.

FIG. 8 illustrates a more detailed method 800 for determining whether the second tuple satisfies the supersede condition 608. In operation 802, the Stream Manager 134 may get the first tuple that is an instance of data. In operation 804, the Stream Manager 134 may get the second tuple that is an instance of the "same" data as the first tuple. In operation 806, the Stream Manager 134 may inspect the attributes of the first and second tuple and determine which tuple is "better" data. To determine which tuple is "better" data, a developer may define parameters that will establish the supersede condition and the Steam Manager 134 will use the set parameters to determine if the second tuple satisfies the supersede condition. If the second tuple does satisfy the supersede condition, the Stream Manager 134 eliminates the first tuple from the application 808 For example, in securities trading, it is critical that investors get the most updated price possible. In streaming applications, where tuples contain information that reports certain stock prices at a certain time, delays in processing the tuples increases the age of the data, possibly reducing its value in a real-time scenario. In some instances, tuples that are delayed too long may lose all of their value and become irrelevant. For example, a first tuple that reports a first price of a certain stock at a first time, is being processed by the application when a second tuple that reports a second price of a the same stock at a second time enters the application from the input stream. Not only is the first tuple irrelevant because it reports a price of the stock that is no longer accurate, but it is also potentially delays the second tuple from being processed, because the application still has to process the first tuple. This hinders investors on receiving the most accurate and up to date information, information that is critical to decision making. Therefore, in this example, the attribute that may determine whether the second tuple is "better" data than the first, is that the second tuple is more recent than the first, and the first tuple may be eliminated from the application 808.

"Better" data does not always imply that the second tuple has entered the application at a more recent time than the first tuple. For example, resolution is a valuable quality when evaluating pictures. In streaming applications, where tuples contain images, multiple tuples may contain the same image. Furthermore, tuples of the same image may have been produced by different cameras and one camera may have higher resolution than another. Therefore, the image would be clearer from the camera with higher resolution. The higher resolution may be evident in the attributes of a second tuple relative to the attributes of a first tuple that is the "same" instance of data. For example, a second tuple may have a value for more of its attributes than the first tuple, or the second tuple may have a higher value for an attribute when compared to the first tuple. If the tuples contained the same image, the second tuple with the higher resolution can be determined to have "better" data and the first tuple can be eliminated from the application 808, possibly without any consideration given to which tuple is more recent. This will decrease processing delay a tuple may receive and it may decrease the time spent on processing tuples that will not be used.

Location is another feature that may be of importance when deciding whether a tuple contains "better" data than another tuple. For example, tuples may contain weather information that is obtained from sensors. One sensor may be in one location and another in a second location. The first sensor may collect data about a third location and the second sensor may collect data about the third location as well. The second sensor may be closer to the third location than the first sensor and the quality of the data the sensors collect and may be dependent on the location of the sensor relative to the third location. The proximity of the sensor may be evident in the attributes of the second tuple, which comes from the second sensor, relative to the attributes of the first tuple, which comes from the first sensor. For instance, the second tuple may have a value for more of its attributes than the first tuple, or the second tuple may have a higher value for an attribute when compared to the first tuple. The second tuple can be determined to have "better" data and the first tuple can be eliminated from the application 808.

The examples described have been illustrated in detail to elaborate on the freedom the developer has in deciding what criteria he or she deems is important so as to determine whether a tuple has "better" data compared to another tuple that has not exited the application and is the "same" instance of data. These examples have also been illustrated to stress the importance of the attributes. The developer is responsible for understanding what type of data the tuples are instances of and the attributes that determine which tuples are "better" data. With this in mind, the developer has the capability to decrease the delay in processing time and provide more accurate and up to date information.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language; (b) conventional procedural programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to exemplary embodiments, other and further embodiments of the disclosure may be devised without departing from the basic scope thereof, and the scope thereof is determined by the claims that follow.

What is claimed is:

1. A method comprising:
monitoring at least one input stream of tuples to be processed by an application, the application comprising one or more processing elements operating on one or more computer processors, each tuple an instance of data;
identifying a first tuple in the at least one input stream, the first tuple a first instance of first data, the first tuple in a target portion of the application;
identifying a second tuple in the at least one input stream;
determining that the second tuple is a second instance of the first data, the second instance and the first instance each representing the first data;
determining that the second tuple satisfies criteria for superseding the first tuple;
determining that the second tuple is not in the target portion of the application;
retaining the first tuple in the application based on the first tuple being in the target portion of the application and further based on the determining that the second tuple is not in the target portion of the application;
determining, after the retaining, that the second tuple has entered the target portion of the application;
determining that the first tuple remains in the target portion of the application; and
eliminating the first tuple from the application based on the determining that the second tuple is the second instance of the first data, further based on the determining that the second tuple satisfies the criteria for superseding the first tuple, further based on the determining that the second tuple has entered the target portion of the application, and further based on the determining that the first tuple remains in the target portion of the application;
determining a performance optimization of one or more stream operators, the determination based on balancing the benefit of distributing the stream operators across the processing elements against the benefit of increased inter-operator communication; and
fusing the stream operators in response to the determined performance optimization.

2. The method of claim 1, wherein the first tuple is assigned a first identifier, the second tuple is assigned a second identifier, and wherein the first identifier and the second identifier are in a tuple registry, the method further comprising:
assigning an identifier to each tuple entering a portion of the application;
adding the assigned identifier to the tuple registry; and
removing the assigned identifier from the tuple registry for each tuple exiting the portion of the application.

3. The method of claim 1, wherein eliminating the first tuple from the application comprises:
removing the first tuple from the application prior to the first tuple being processed by the application; and
processing the second tuple.

4. The method of claim 1, wherein the first tuple includes a temporal attribute having a first value, the second tuple includes the temporal attribute having a second value more recent than the first value, and wherein the criteria for superseding the first tuple includes having a more recent value than the first tuple for the temporal attribute.

5. The method of claim 1, wherein the first tuple includes a resolution attribute having a first value, the second tuple includes the resolution attribute having a second value higher than the first value, and wherein the criteria for superseding the first tuple includes having a higher value than the first tuple for the resolution attribute.

6. The method of claim 1, wherein the first tuple includes a locality attribute having a first value, the second tuple includes the locality attribute having a second value preferred over the first value, and wherein the criteria for superseding the first tuple includes having a preferred value over the first tuple for the locality attribute.

7. The method of claim 2, wherein the first identifier and the second identifier are mapped to the first data in the registry, the method further comprising:
identifying the data for each tuple entering the portion of the application; and
mapping the identified data to the assigned identifier in the registry.

8. The method of claim 7, wherein each of the first tuple and the second tuple share at least one attribute, and wherein the determining that the second tuple is a second instance of the first data comprises:
comparing the at least one attribute to defined data instance criteria; and
determining that the at least one attribute satisfies the defined data instance criteria.

9. The method of claim 5, wherein the first data is an image, wherein the resolution attribute is camera resolution, wherein the first tuple is a first instance of the image taken by a first camera having a first resolution, wherein the second tuple is a second instance of the image taken by a second camera having a second resolution, and wherein the second resolution is higher than the first resolution.

10. The method of claim 9, wherein the second instance of the image was taken earlier than the first instance of the image.

* * * * *